(12) United States Patent
Matsa et al.

(10) Patent No.: US 9,037,617 B2
(45) Date of Patent: May 19, 2015

(54) CONCURRENT ADD-HEAVY SET DATA GATHERING

(75) Inventors: Moshe M. E. Matsa, Cambridge, MA (US); Eric D. Perkins, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 858 days.

(21) Appl. No.: 12/945,644

(22) Filed: Nov. 12, 2010

(65) Prior Publication Data

US 2012/0124107 A1    May 17, 2012

(51) Int. Cl.
  *G06F 12/00*    (2006.01)
  *G06F 17/30*    (2006.01)

(52) U.S. Cl.
  CPC .............. *G06F 17/30359* (2013.01)

(58) Field of Classification Search
  CPC .............. G06F 17/30312; G06F 17/30359
  USPC .............. 708/816
  See application file for complete search history.

(56) References Cited

U.S. PATENT DOCUMENTS

| | | | |
|---|---|---|---|
| 6,857,064 B2 | 2/2005 | Smith et al. | |
| 7,000,234 B1 | 2/2006 | Shavit et al. | |
| 7,234,044 B1 | 6/2007 | Perry | |
| 7,293,143 B1 | 11/2007 | Shavit et al. | |
| 8,181,019 B2* | 5/2012 | Saha et al. | 713/158 |
| 2009/0132563 A1 | 5/2009 | Herlihy et al. | |
| 2009/0300224 A1* | 12/2009 | Duffy et al. | 710/6 |

OTHER PUBLICATIONS

Heller et al, "A Lazy Concurrent List-Based Set Algorithm," LNCS, v. 3974/2006, 2006.
Tuyisenge, "Analyzing Non-Blocking Concurrent Data Structures," African Inst. for Mathematical Sciences, May 20, 2010.
U.S. Appl. No. 12/945,689, filed Nov. 12, 2010, entitled "Concurrent Core Affinity for Weak Cooperative Multithreading Systems", invented by Matsa, M.M.E. and E.D. Perkins, Total 25 pp.

* cited by examiner

*Primary Examiner* — Jacob F Bétit
*Assistant Examiner* — Christy Kim
(74) *Attorney, Agent, or Firm* — Janaki K. Davda; Konrad, Raynes, Davda & Victor LLP

(57) ABSTRACT

Object are created such that each of the objects stores a bit that designates eventual removal of one of the objects. Further, the objects are added to a data structure that includes a set that comprises a union of a plurality of subsets such that each subset in the plurality of subsets is stored separately according to a corresponding thread and such that an added object that is added to the set by a given thread is stored in the corresponding subset. In addition, one of the objects is logically removed, without physical removal, from the set by activating the bit. Each subset is periodically swept. All objects marked with the activated bit are physically removed.

20 Claims, 4 Drawing Sheets

CONCURRENT ADD-HEAVY SET DATA GATHERING

BACKGROUND

1. Field

This disclosure generally relates to a computing environment. More particularly, the disclosure relates to data gathering.

2. General Background

The computer set data structure has three operations: Add( ) Remove( ) and some form of accessor to read the contents of the set. Typical sets access the contents of the set approximately ninety percent of the time, perform Add( ) approximately nine percent of the time, and perform Remove( ) approximately one percent of the time. Thus, most implementations are optimized for these scenarios. In particular, most implementations are optimized around read-access being fast.

However, applications also often have to record information for use in unusual situations. An example is information that will only be utilized in the case of debugging, but cannot be reacquired later and thus has to be saved. Another example is information that will only be utilized in an infrequent clean-up activity. Any of these situations share the property that they frequently perform Add( ) and Remove( ) but rarely ever access the contents of the set. Such a set is referred to as an Add-Heavy Set. The Add( ) and Remove( ) operations have to be efficient and highly performant, but the accessor function performance is nearly irrelevant in such situations.

The set has to be specifically designed to address these concerns when multi-core systems with many threads running are involved. In these situations, typical implementations may lock or otherwise have slower implementations of Add( ) in order to keep accessing the set wait-free. This tradeoff is not beneficial for an Add-Heavy set.

Wait-free concurrent set implementations, which are wait-free for all operations, involve special synchronization primitives for Add( ) and Remove( ) such as Compare-and-Swap on X86. These instructions have to go to main memory and are very slow compared with normal instructions which at most access the processor's Level-1 cache.

SUMMARY

Method, system and computer program product embodiments of the invention are provided for data gathering by creating objects such that each of the objects stores a bit for designating eventual removal of one of the objects, adding the objects to a data structure that includes a set that comprises a union of a plurality of subsets such that each subset in the plurality of subsets is stored separately according to a corresponding thread and such that an added object that is added to the set by a given thread is stored in the corresponding subset, logically removing, without physical removal, one of the objects by activating the bit and periodically sweeping each subset and physically removing all objects marked with the activated bit.

DRAWINGS

The above-mentioned features of the present invention will become more apparent with reference to the following description taken in conjunction with the accompanying drawings wherein like reference numerals denote like elements and in which.

DETAILED DESCRIPTION

A data gathering method, system, and computer program product is provided that enables data gathering with optimal performance. In one embodiment, objects are allowed to be logically removed from a list without being physically removed by having the objects store a bit for logical removal from the set. Objects are not re-used. Once an object is passed to the set, it can be viewed, but it is owned by the set. Internally, the set is implemented as the union of several subsets which are stored separately per-thread. In one embodiment, each subset can only have objects added and physically removed by its thread. Therefore, each subset can be implemented without using main memory concurrency primitives for thread safety, i.e., without any Compare and Swap ("CAS")-style main-memory operations and without any locking. The term CAS is herein intended to include any main-memory synchronization primitive such as Compare and Swap, Load-Linked/Store-Conditional, or any other Read-Modify-Write instruction or set of instructions. Without locks or CAS operations, Add( ) and Remove( ) can be extremely fast. The Add( ) operation can accomplish physical removal by periodically physically removing all logically removed entries from the current thread's subset, e.g., once per second or every one hundredth time. The objects may then be deleted or recycled. Reading the contents of the set is read-only and can happen on any thread as long as minimal synchronization prevents reading and physical deletion at the same time.

Figure 1:
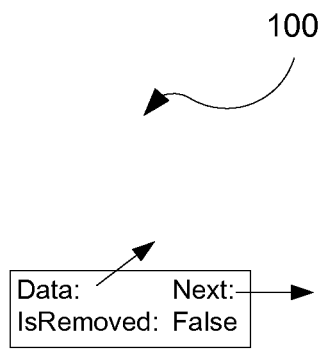
FIG. 1 illustrates an object that is created by an application according to an embodiment of the present invention.

FIG. 1 illustrates an object 100 that is created by an application according to an embodiment of the present invention. In one embodiment, the field IsRemoved equals False. The object with is passed into a set with the appropriate data.

Figure 2:
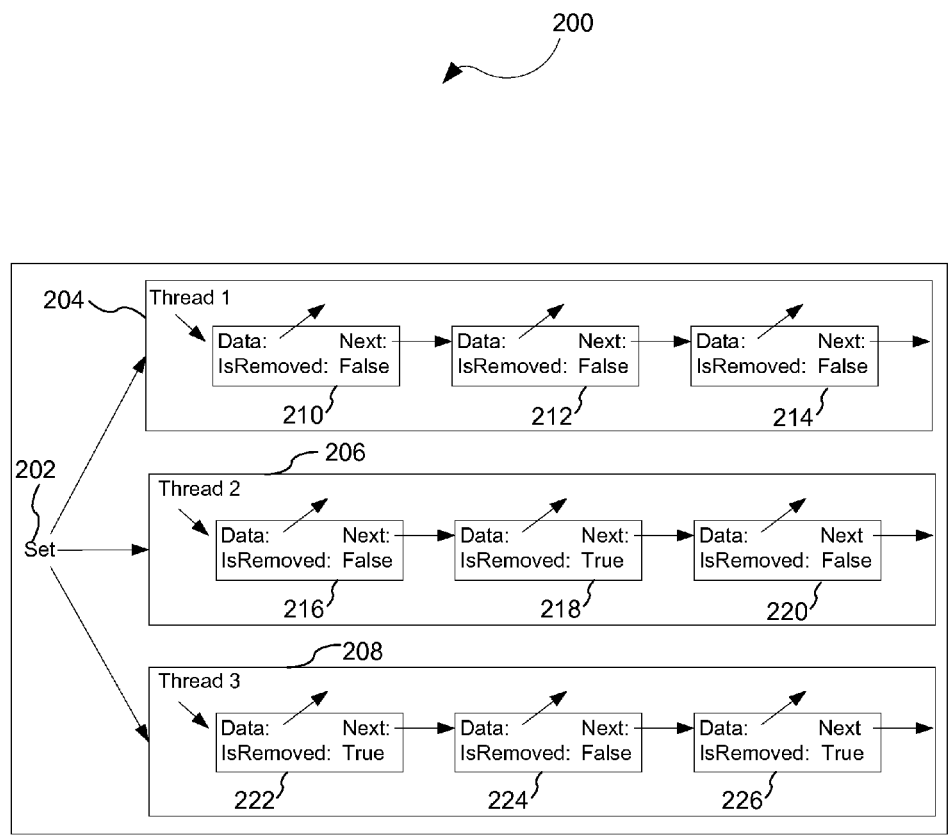
FIG. 2 illustrates a data structure according to an embodiment of the present invention.

FIG. 2 illustrates a data structure 200 according to an embodiment of the present invention. Objects are passed into a set 202. A determination is made in the set as to which thread is currently running. The relevant object is added at the front of the linked list for a subset of the set 202.

As an example, the set 202 has one or more subsets that are stored on a first thread 204, a second thread 206, and a third thread 208. The first thread 204 stores a subset with a first object 210 with an IsRemoved bit that is False, a second object 212 with an IsRemoved bit that is False, and a third object 214 with an IsRemoved bit that is False. Further, a second thread 206 stores a subset with a first object 216 with an IsRemoved bit that is False, a second object 218 with an IsRemoved bit that is True, and a third object 220 with an IsRemoved bit that is False. In addition, a third thread 208 stores a subset with a first object 222 with an IsRemoved bit that is True, a second object 224 with an IsRemoved bit that is False, and a third object 226 with an IsRemoved bit that is True.

To pick a subset, the mapping from thread id to subset does not involve any locking or synchronization if the mapping already has the subset, which is the common occurrence. A CAS is not utilized."

To perform the Add( ) operation, each subset performs an Add( ) operation by initially setting the object's Next pointer to the head pointer of the subset and then setting the head pointer of the subset to point to the new object. Only two memory writes are involved without any locking or CASs. This action linearizes to the moment when the head pointer changes. The caller guarantees that the caller will only perform the Add( ) operation once. Therefore, the object in uniquely accessed on this thread. Further, the subset's head pointer is only ever modified by this thread.

A system scheduler may possibly suspend the thread after setting of this Next pointer and before setting the head pointer, but until the system scheduler reschedules the thread, nothing else will be added to this subset. After the system scheduler reschedules the thread, the thread setting the head pointer to the new object will be the first thing that is processed.

The caller performs the Remove( ) operation to invoke removal without informing the set by setting the IsRemoved field to True. Neither locking nor main-memory synchronization primitives such as CAS are involved. The Remove( ) operation is linearized to exactly that cycle when the IsRemoved field is set to True.

In one embodiment, physical removal is performed periodically during Add( ) by traversing the linked list and removing entries with IsRemoved set to True. Each physical removal takes a single pointer assign of the previous Next pointer to point to the next object. Since this is only done on the owning thread, the Add( ) operation does not provide any interference.

The physical removal is ensured not to overlap with data access. Reading is infrequent and can thus be under a lock to ensure only one reader at a time. As a result, the problem of synchronization between a single reader thread and the single physical removal thread per subset is reduced in complexity. Further, the common-case Add( ) and Remove( ) routines can notice when data access is in progress and postpone any physical cleanup work during data access, until after data access is complete.

The operation to access data locks in order to ensure that only one thread at a time performs data access. The one thread from the lock makes sure that it is not reading any given subset during physical removal. This can be accomplished with simple two-thread mutual exclusion using standard read/write registers. Then, the thread can just read through each subset's data and ignore any logically-removed entries. In most cases, infrequent use of such data, for example in error or logging conditions or other exceptional conditions, is already guarded by a lock or otherwise ensured to only happen non-concurrently. Thus, in many cases this requirement is already guaranteed.

This read lock is not necessary, but is simple, and has no impact on the performance of Add or Remove, which are assumed to be the only operations which can impact overall system performance. A lock-free implementation may be utilized, which would then involve CAS or similar main-memory synchronization primitive during physical delete or for synchronization of which read threads are interacting with physical delete. However, a single lock on read maximizes the common-case performance of Add( ) which performs a physical delete.

As a result, a significant amount of tracking per-transaction results in the system 200, which may rarely make use of the newly stored information without significantly impacting normal per-transaction performance. Accordingly, significant improvements in debugging and resource tracking and allocation may result without impacting performance. The data structure described herein may be utilized in a variety of situations such as, for example, the following: a larger number of Add( ) and Remove( ) operations with very few data access operations, a multi-threaded system, data without exact snapshot semantics, locking is too slow for any per-transaction synchronization, CAS and other main memory synchronization primitives are also too slow for per-transaction work. These examples are provided only as examples as the data structure may be utilized in a variety of other conditions. In one embodiment, high priority threads may each have their own subset, but low priority threads may share one or more subsets with some extra synchronization on use of that subset.

Figure 3:
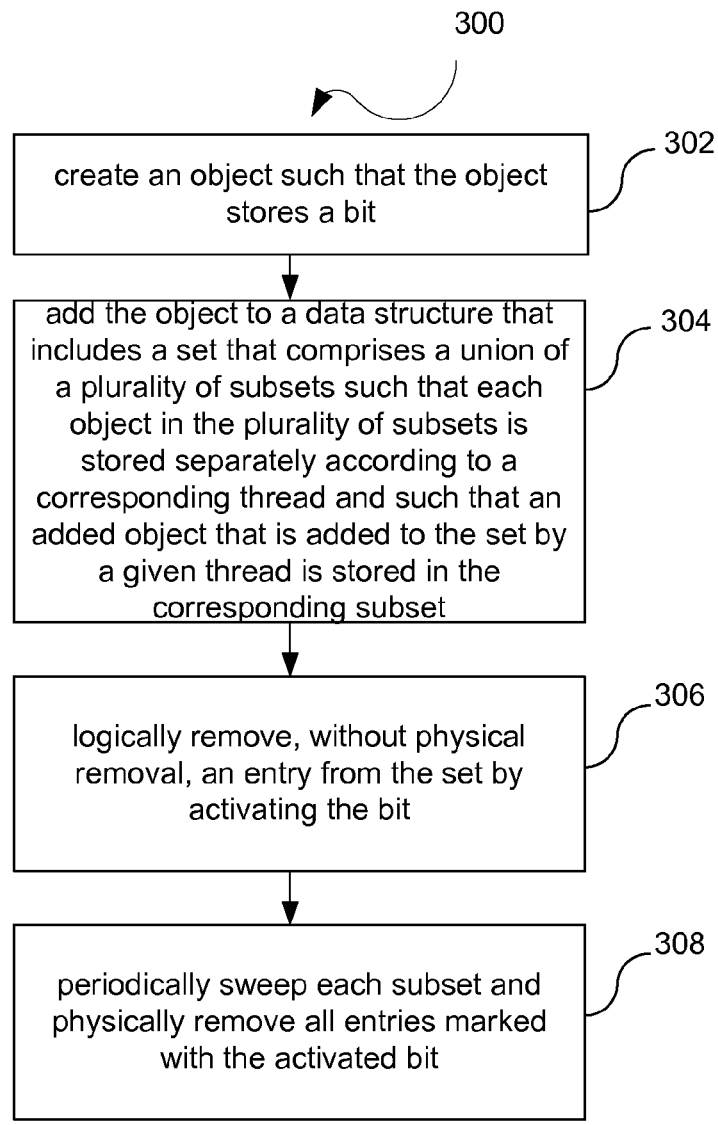
FIG. 3 illustrates a process that may be utilized for data gathering.

FIG. 3 illustrates a process 300 that may be utilized for data gathering. At a process block 302, the process 300 creates objects such that each of the objects stores a bit for designating eventual removal of one of the objects. Further, at a process block 304, the process 300 adds the objects to a data structure that includes a set that comprises a union of a plurality of subsets such that each subset in the plurality of subsets is stored separately according to a corresponding thread and such that an added object that is added to the set by a given thread is stored in the corresponding subset. In addition, at a process block 306, the process 300 logically removes, without physical removal, one of the objects by activating the bit. At a process block 308, the process 300 periodically sweeps each subset and physically removes all objects marked with the activated bit.

In one embodiment, the logical removal is performed on the thread effectuating the logical removal and does not have to be performed on a thread that performs the addition. Further, in one embodiment, the physical removal sweep is per-thread by a given thread on the subset corresponding to the thread. The object may be stored either directly or indirectly. Further, the sweep may be trigger at a time that another entry is added, by a timer, or by logical removal of an entry.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool.

In one embodiment, a process adaptively delays cleanup of a data structure based on a workload associated with the data structure. The process involves maintaining a running metric of the size of the recent growth of the data structure and an initial limit associated with the size of the data structure. For example, a variable mMetric may denote a metric corresponding to the recent growth in size and a variable mLimit may correspond to an initial limit of the of the data structure. Further, mMetric is initialized to zero and mLimit to a value INITIAL_LIMIT as illustrated below.

int mMetric=0;
    int mLimit=INITIAL_LIMIT;

When the size of the data structure is increased, the metric is increased appropriately as illustrated below.

mMetric++;

An increase in size of the data structure indicates that work is being added that may need to be cleaned-up later. Each time the metric is increased, the metric is compared with the current limit to determine if the metric is over the current limit as illustrated below. If the metric is over the current limit, then the data structure is cleaned up.

if (mMetric>mLimit)

In addition, the current size of the data structure is calculated. Subsequently, the value of mLimit is updated to be the average of the old size of the data structure and the current size of the data structure as illustrated below. This damps the old estimate of the size of the data structure with a new estimate, as a best overall estimate of workload in the near future.

mLimit=((mLimit+size)/2); //damp new estimate with old estimate

This updated value is maintained above the INITIAL_LIMIT value to allow for amortizing the cleanup work over a greater number of useful operations as illustrated below.

mLimit=mLimit>INITIAL_LIMIT? mLimit:INITIAL_LIMIT; //floor at INITIAL_LIMIT

To complete the process of adaptively delaying cleanup of the data structure, the current count mMetric is reset to zero.

Thus, the process maintains a sensible minimum of how long to wait to cleanup, so that it is not done too often. Also, the process keeps a running metric of the size of the recent growth of the data structure, and of a maximum amount of growth to reach before cleanup. The time taken for a clean-up operation as disclosed herein is significantly lower as compared to a non-adaptive clean-up rate. As an example, this process is helpful in the context of highly concurrent data structures where delayed cleanup is often utilized to minimize contention and enable lock freedom.

Figure 4:
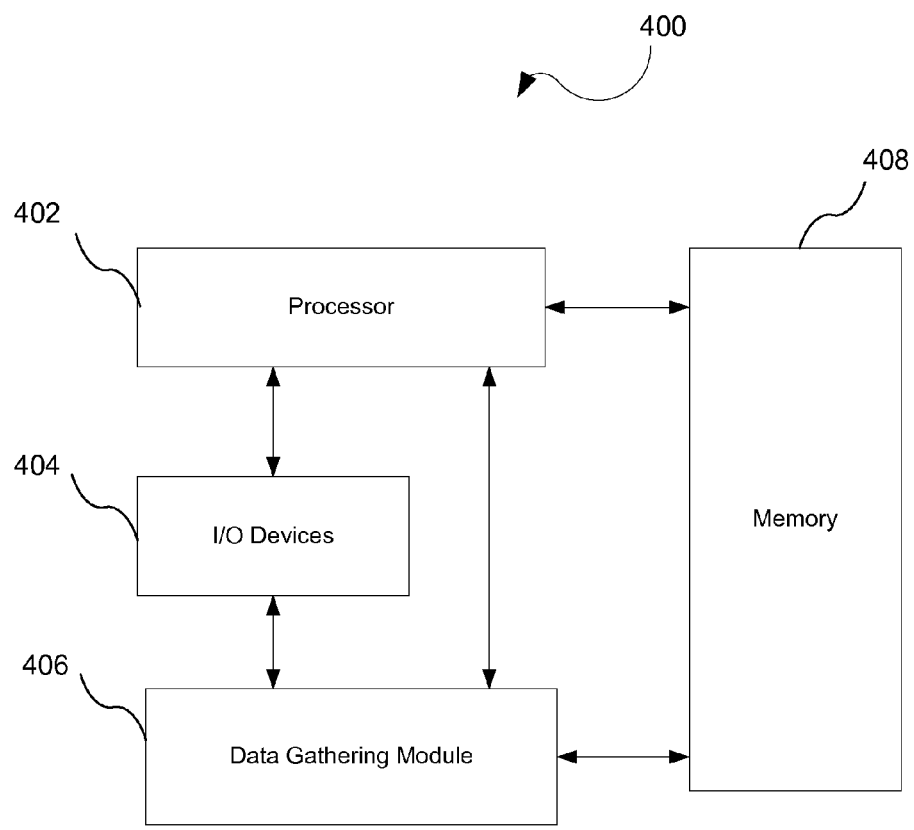
FIG. 4 illustrates a block diagram of a system that performs data gathering according to an embodiment of the present invention.

FIG. 4 illustrates a block diagram of a system 400 that performs data gathering according to an embodiment of the present invention. In one embodiment, the system 400 is suitable for storing and/or executing program code and is implemented using a general purpose computer or any other hardware equivalents. Thus, the system 400 comprises a processor 402, a memory 408, e.g., random access memory ("RAM") and/or read only memory ("ROM"), a data gathering module 406, and various input/output devices 404.

The processor 402 is coupled, either directly or indirectly, to the memory 408 through a system bus. The memory 408 may include local memory employed during actual execution of the program code, bulk storage, and/or cache memories which provide temporary storage of at least some program code in order to reduce the number of times code must be retrieved from bulk storage during execution.

The input/output devices 404 may be coupled directly to the system 400 or through intervening input/output controllers. Further, the input/output devices 404 may include a keyboard, a keypad, a mouse, a microphone for capturing speech commands, a pointing device, and other user input devices that will be recognized by one of ordinary skill in the art. Further, the input/output devices 404 may include a receiver, transmitter, speaker, display, image capture sensor, biometric sensor, etc. In addition, the input/output devices 404 may include storage devices such as a tape drive, floppy drive, hard disk drive, compact disk ("CD") drive, digital video disk ("DVD") drive, etc.

Network adapters may also be coupled to the system 400 to enable the system 400 to become coupled to other systems, remote printers, or storage devices through intervening private or public networks. Modems, cable modems, and Ethernet cards are just a few of the currently available types of network adapters.

For any of the configurations described herein, various actions may take place when the call stack is retrieved. In one embodiment, the retrieved call stack is walked into a tree and the leaf node of the tree has its base count incremented, which allows for utilization of technology to produce reports or to view the collected information.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The "processor" of a general purpose computer, special purpose computer, or other programmable data processing apparatus may be referred to herein as a "microprocessor." However, the term "microprocessor" should not be interpreted as being limited to a single-chip central processing unit or any other particular type of programmable data processing apparatus, unless explicitly so stated.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

Reference throughout this Specification to "one embodiment," "an embodiment," or similar language means that a particular feature, structure, or characteristic described in connection with the embodiment is included in at least one embodiment of the present invention. Thus, appearances of the phrase "in one embodiment," "in an embodiment," and similar language throughout this Specification may, but do not necessarily, all refer to the same embodiment. Furthermore, the described features, structures, or characteristics of the invention may be combined in any suitable manner in one or more embodiments. Correspondingly, even if features are initially claimed as acting in certain combinations, one or more features from a claimed combination may in some cases be excised from the combination, and the claimed combination may be directed to a subcombination or variation of a subcombination.

While the computer program product, method and system have been described in terms of what are presently considered to be the most practical and preferred embodiments, it is to be understood that the disclosure need not be limited to the disclosed embodiments. The disclosure is intended to cover various modifications and similar arrangements included within the spirit and scope of the claims, the scope of which should be accorded the broadest interpretation so as to encompass all such modifications and similar structures. The present disclosure includes any and all embodiments of the following claims.

We claim:

1. A computer program product comprising: a non-transitory computer readable storage medium having computer readable program code embodied therewith, wherein the computer readable storage medium excludes a computer readable signal medium, and the computer readable program code comprising:
   computer readable program code to store a data structure includes a set that includes multiple subsets, wherein each of the subsets is a linked list for storing objects and is associated with a thread, wherein each of the objects stores a bit for designating whether that object has been logically removed;
   computer readable program code to create an object, wherein the object stores a bit for designating whether that object has been logically removed;
   computer readable program code to add the object to the data structure by mapping a thread identifier of a thread that is adding the object to a subset for that thread and storing the object in the subset for that thread;
   computer readable program code to logically remove, without physical removal, one of the objects by mapping a thread identifier of a thread that is removing the object to a subset for that thread and activating the bit in the object; and
   computer readable program code to adaptively delay cleanup of the data structure based on a workload associated with the data structure by:
      maintaining a first size of the data structure; and
      in response to the first size exceeding an initial limit,
         sweeping each subset and physically removing all objects marked with the activated bit;
         calculating a second size of the data structure based on the objects marked with the activated bit having been removed; and
         calculating a new value for the initial limit based on an average of the first size of the data structure and the second size of the data structure.

2. The computer program product of claim 1, wherein the logical removal is performed on a thread effectuating the logical removal and does not have to be performed on a thread that performs the addition.

3. The computer program product of claim 1, wherein the sweep is per-thread by a given thread on the subset corresponding to the thread.

4. The computer program product of claim 1, wherein each of the objects stores the bit directly.

5. The computer program product of claim 1, wherein each of the objects stores the bit indirectly.

6. The computer program product of claim 1, wherein determination of whether the first size exceeds the initial limit is periodically triggered when adding another object.

7. The computer program product of claim 1, wherein determination of whether the first size exceeds the initial limit is periodically triggered by a timer.

8. The computer program product of claim 1, wherein determination of whether the first size exceeds the initial limit is periodically triggered by logical removal of an object.

9. A method comprising:
  storing, using a processor of a computer, a data structure includes a set that includes multiple subsets, wherein each of the subsets is a linked list for storing objects and is associated with a thread, wherein each of the objects stores a bit for designating whether that object has been logically removed;
  creating an object, wherein the object stores a bit for designating whether that object has been logically removed, without being physically removed;
  adding the object to the data structure by mapping a thread identifier of a thread that is adding the object to a subset for that thread and storing the object in the subset for that thread;
  logically removing, without physical removal, one of the objects by mapping a thread identifier of a thread that is removing the object to a subset for that thread and activating the bit in the object; and
  adaptively delaying cleanup of the data structure based on a workload associated with the data structure by:
    maintaining a first size of the data structure; and
    in response to the first size exceeding an initial limit,
      sweeping each subset and physically removing all objects marked with the activated bit;
      calculating a second size of the data structure based on the objects marked with the activated bit having been removed; and
      calculating a new value for the initial limit based on an average of the first size of the data structure and the second size of the data structure.

10. The method of claim 9, wherein the logical removal is performed on a thread effectuating the logical removal and does not have to be performed on a thread that performs the addition.

11. The method of claim 9, wherein the sweep is per-thread by a given thread on the subset corresponding to the thread.

12. The method of claim 9, wherein each of the objects stores the bit directly.

13. The method of claim 9, wherein each of the objects stores the bit indirectly.

14. The method of claim 9, wherein determination of whether the first size exceeds the initial limit is periodically triggered when adding another object.

15. The method of claim 9, wherein determination of whether the first size exceeds the initial limit is periodically triggered by a timer.

16. The method of claim 9, wherein determination of whether the first size exceeds the initial limit is periodically triggered by logical removal of an object.

17. A system comprising:
  a processor;
  storage coupled to the processor, wherein the storage stores program code, and wherein the processor executes the program code to perform:
    storing a data structure includes a set that includes multiple subsets, wherein each of the subsets is a linked list for storing objects and is associated with a thread, wherein each of the objects stores a bit for designating whether that object has been logically removed;
    creating an object, wherein the object stores a bit for designating whether that object has been logically removed, without being physically removed;
    adding the object to the data structure by mapping a thread identifier of a thread that is adding the object to a subset for that thread and storing the object in the subset for that thread;
    logically removing, without physical removal, one of the objects by mapping a thread identifier of a thread that is removing the object to a subset for that thread and activating the bit in the object; and
    adaptively delaying cleanup of the data structure based on a workload associated with the data structure by:
      maintaining a first size of the data structure; and
      in response to the first size exceeding an initial limit,
        sweeping each subset and physically removing all objects marked with the activated bit;
        calculating a second size of the data structure based on the objects marked with the activated bit having been removed; and
        calculating a new value for the initial limit based on an average of the first size of the data structure and the second size of the data structure.

18. The system of claim 17, wherein the logical removal is performed on a thread effectuating the logical removal and does not have to be performed on a thread that performs the addition.

19. The system of claim 17, wherein the sweep is per-thread by a given thread on the subset corresponding to the thread.

20. The system of claim 17, wherein each of the objects stores the bit directly.

* * * * *